Feb. 23, 1943.  A. L. KEELER  2,312,216
FLOW MEASURING DEVICE
Filed Aug. 26, 1941
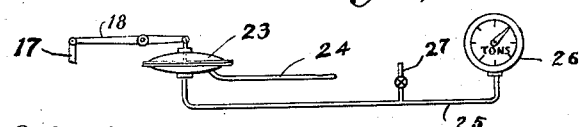
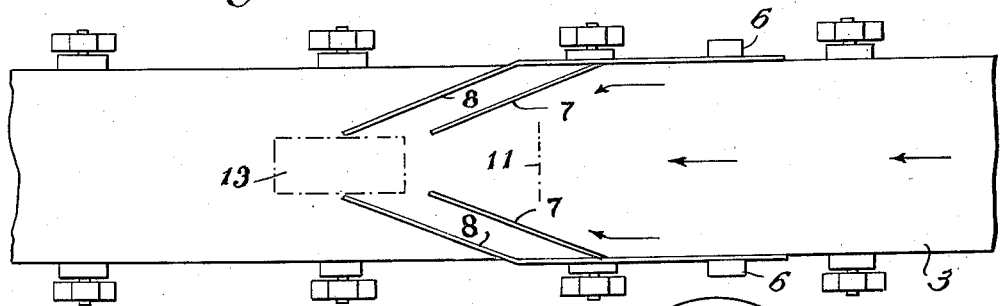
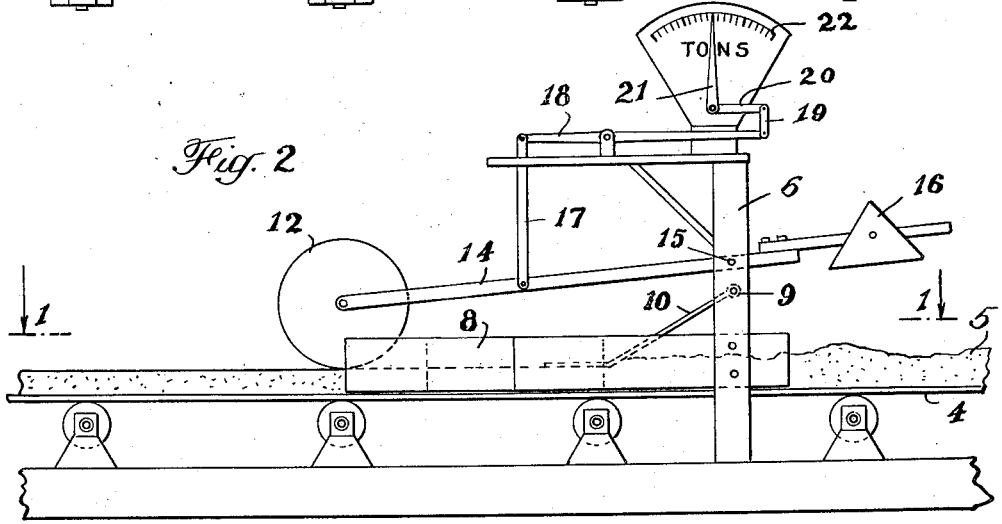
INVENTOR
Amos L. Keeler
BY
Oswald G. Hayes
ATTORNEY Patented Feb. 23, 1943

2,312,216

UNITED STATES PATENT OFFICE

2,312,216

FLOW MEASURING DEVICE

Amos L. Keeler, Paulsboro, N. J., assignor to Socony-Vacuum Oil Company, Incorporated, New York, N. Y., a corporation of Maine Application August 26, 1941, Serial No. 408,299

1 Claim. (Cl. 73—198)

This invention is directed to the provision of a measuring device useful to indicate the amount of material being handled upon a continuously moving conveyor belt.

Many industries utilize conveyor belts for transporting materials of rather uniform physical properties. A quite pertinent example is the transportation of fuller's earth in filter plants in petroleum refining, or the transportation of clay-like catalyst masses in continuous catalytic petroleum refining processes.

Rather elaborate continuous weighing machines and similar devices have been developed for measuring the amounts of materials being so handled, but there remains a need for a simple, inexpensive, and comparatively accurate device for use at a multitude of points in such processes where knowledge of conditions is needful but the use of the highly complicated and expensive devices now developed is out of the question.

It has been my object to provide a relatively simple device for such measuring purposes, and I have found the one so developed by me to have a highly satisfactory degree of accuracy.

In order to explain my device, I now make reference to the drawing attached hereto. In this drawing Figure 1 is a plan view and Figure 2 an elevation of my device, while Figure 3 shows an accessory which may be applied thereto. In Figures 1 and 2, which should be read together, 4 is a conveyor belt, and 5 is the material thereon. 6—6 are uprights for the support of the measuring structure. In this device there are provided two sets of side "plows" 7—7 and 8—8 which serve to uniformly force the conveyed material to the center of the belt. These "plows" are supported from the uprights 6—6. Further, on a shaft 9 extending across the belt 4, and supported by uprights 6—6, there is pivoted a central leveling vane 10 which contacts the conveyed material at a point indicated by the dotted line 11 (on Figure 1). The cooperation of plows 7—7, 8—8 and vane 10 serve to shape the material being conveyed into a flat topped stream of roughly trapezoidal cross section with a constant base, the height of which is directly proportional to the amount being conveyed. This height is then measured by a counterweighted roller 12, contacting the stream within the dotted area 13 (Figure 1), this roller being supported by arms 14 pivoted at points 15 on uprights 6, the roller being counterweighted by weight 16 mounted on a rearward extension of arms 14. The position of the roller 12 is reported as a scale reading by a lever, link and scale system consisting of link 17, a fixed pivot lever 18, link 19, arm 20, pointer 21 and scale 22.

Also I may quite effectively so arrange my mechanism as to give readings at remote points by an arrangement such as that shown at Figure 3, where link 17 and fixed pivot lever 18 serve to actuate, instead of a pointer, through any appropriate linkage, a valve, usually of the well known and widely used diaphragm type, such as 23 to release operating fluid, as compressed air, from supply pipe 24 to flow into an indicating system 25—26 to permit a remote indication of the position of roller 12. One effective way to do this is that shown, where 26 is a pressure gauge and 27 a constant leak, the position of roller 12 then being indicated by the pressure level in pipe 25, reported by pressure gauge 26 which may be calibrated in tons per hour.

The principle of operation is that a moving stream of material upon a conveyor belt is reduced to a roughly trapezoidal cross section with a height proportional to the amount being conveyed, and that height is measured by angular displacement of a swinging arm and that displacement is reported on a scale calibrated in quantities.

I claim:

In a conveyor belt mechanism, a belt, a pair of vertical supports upon either side of said belt, side plows extending from said support over said belt to shape the stream of material being conveyed by said belt, a shaft extending between said supports and on said shaft a levelling vane in contact with the top of said stream to level its top, a second shaft between said supports and a lever pivoted thereon, on said lever a roller riding upon the shaped material stream, and means for indicating the angular displacement of said lever as caused by the height of the material stream passing under said roller.

AMOS L. KEELER.

CERTIFICATE OF CORRECTION.

Patent No. 2,312,216.　　　　　　　　　　　　　February 23, 1943.

AMOS L. KEELER.

It is hereby certified that error appears in the above numbered patent requiring correction as follows: In the grant, line 3, and in the heading to the printed specification, line 5, for "Maine" read --New York--; second column, line 37, for "support" read --supports--; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.